(12) United States Patent
Meola et al.

(10) Patent No.: US 9,729,045 B2
(45) Date of Patent: Aug. 8, 2017

(54) SWITCHED POWER CONVERTER WITH IMPROVED SYNCHRONIZATION OF A PULSE WIDTH MODULATION SWITCHING FREQUENCY

(71) Applicant: ZENTRUM MIKROELEKTRONIK DRESDEN AG, Dresden (DE)

(72) Inventors: Marco Meola, Munich (DE); Christian Glassner, Berching (DE); Frank Trautmann, Munich (DE)

(73) Assignee: IDT Europe GmbH

( * ) Notice: Subject to any disclaimer, the term of this patent is extended or adjusted under 35 U.S.C. 154(b) by 0 days.

(21) Appl. No.: 15/151,934

(22) Filed: May 11, 2016

(65) Prior Publication Data

US 2016/0336848 A1    Nov. 17, 2016

(30) Foreign Application Priority Data

May 15, 2015   (EP) ..................... 15167868

(51) Int. Cl.
*H02M 3/157*    (2006.01)
*H02M 3/04*     (2006.01)
*H02M 1/08*     (2006.01)
*H02M 1/00*     (2006.01)

(52) U.S. Cl.
CPC .............. *H02M 3/04* (2013.01); *H02M 1/08* (2013.01); *H02M 3/157* (2013.01); *H02M 2001/0012* (2013.01)

(58) Field of Classification Search
CPC ...................... H02M 2001/0012; H02M 3/157
See application file for complete search history.

(56) References Cited

U.S. PATENT DOCUMENTS

| 6,222,745 B1 | 4/2001 | Amaro et al. |
| 7,759,990 B2 * | 7/2010 | Miike ....................... G06F 1/08 327/147 |
| 2011/0141780 A1 | 6/2011 | O'Malley et al. |

FOREIGN PATENT DOCUMENTS

| WO | 2004/047266 A2 | 6/2004 |
| WO | 2007/041554 A2 | 4/2007 |

* cited by examiner

*Primary Examiner* — Matthew Nguyen
*Assistant Examiner* — Ishrat Jamali
(74) *Attorney, Agent, or Firm* — Lippert Stachow

(57) ABSTRACT

Power converter includes a switched power stage to generate an output voltage from an input voltage, and a controller to generate a pulse width modulation (PWM) signal for switching the switched power stage in dependence upon a voltage error signal. The voltage error signal is a difference between a reference voltage and the output voltage. The controller comprises a synchronizer to generate a first clock signal for clocking a low frequency domain of the controller, and a digital PWM controller clocked by the first clock signal and configured to determine an on-time information of the PWM signal and a PWM generator to generate the PWM signal based on the on-time information. The synchronizer is configured to synchronize a frequency of the PWM signal to a frequency imposed by the external reference signal by synchronizing a frequency of the first clock signal to the frequency imposed by the external reference signal.

15 Claims, 3 Drawing Sheets

SWITCHED POWER CONVERTER WITH IMPROVED SYNCHRONIZATION OF A PULSE WIDTH MODULATION SWITCHING FREQUENCY

FIELD OF THE INVENTION

The present invention relates to a power converter with an improved synchronization of a pulse width modulation (PWM) frequency to an external reference signal and related method.

BACKGROUND OF THE INVENTION

Switched DC-DC converters comprise a switchable power stage, wherein an output voltage is generated according to a switching signal and an input voltage. The switching signal is generated in a controller that adjusts the output voltage to a reference voltage. A buck converter is shown in FIG. 1. The switched power stage 11 comprises a dual switch consisting of a high-side switch 12 and a low-side switch 13, an inductor 14 and a capacitor 15. During a charge phase, the high-side switch 12 is turned on and the low-side switch 13 is turned off by the switching signal to charge the capacitor 15. During a discharge phase the high-side switch 12 is turned off and the low-side switch 13 is turned on to match the average inductor current to the load current.

However, it is well known to power engineers that the use of switched DC-DC converters, or in general switched mode power supplies (SMPS), to achieve output voltage regulation with high efficiency has as well disadvantages. One of the most common issues is the emission of high frequency noise related to the switching activity of such power supplies that propagates to adjacent circuitry degrading their performance and often leading to failure of operation. To limit this problem, available SMPS solutions have the functionality to synchronize the switching activity to a host system or to stop the switching activity during critical system operation.

Such a synchronization feature is also advantageous in applications where a parallelization of SMPS is required so that multiphase configuration can be achieved by a synchronized operation of multiple SMPS connected in parallel and driven by a master.

Analog PWM controllers for SMPS address the problem of synchronizing the switching frequency to an external signal by tuning the frequency of an internal oscillator that controls the generation of the PWM signal. The nominal frequency of the internal oscillator can be programmed via a RC network and it can be tuned to the external reference. Although the synchronization process in an analog solution does not impact the stability of loop regulating the output voltage, it has the limitation that the synchronization may not be possible for frequencies of the oscillator too far from the external reference. Therefore, proper values of R and C of the RC network need to be chosen. Moreover, the synchronization activity affects the system clock. Thus, the frequency range of synchronization may be limited by the maximum frequency of operation of the analog circuitry.

A synchronization feature is available in digital PWM controllers as well. The nominal switching frequency of the SMPS can be selected by programming it into a register or selecting it via pin-strapping. Such a frequency in contrast to analog solutions is not affected by the tolerance of external components. The most common approach is to use an internal phase locked loop (PLL) whose frequency is locked to the external reference signal. The PLL then provides the clock signal to the digital control logic as well as to the digital PWM generator. Due to the architecture of the digital controller, controller parameters are a function of the sampling frequency of the output voltage and therefore performance of the output voltage regulation loop may be affected by the synchronization process. As well, the loss of the external reference signal may lead to oscillation of the output voltage because it affects directly the frequency of operation of the digital PWM generator.

SMPS generally regulate the output voltage Vout from input voltage Vi to a desired set point, i.e. reference voltage, by means of controlling the on-time of the high-side switch and the low side switch in a periodically with constant switching frequency Fsw. Although SMPS are developed to operate at a nominal switching frequency chosen by the user to match application requirements, there is a need to control the frequency of the switching activity in a way that the switching frequency of the SMPS is synchronous to the frequency of an external reference signal, i.e. the period and phase of the external reference signal equals the ones of the switching signal of the SMPS. However, varying the switching frequency while a SMPS is in operation may lead to oscillation on the output voltage during the synchronization phase, and, in extreme cases, to instability of the output voltage control loop itself. Hence, there is a need to control the frequency of the switching activity while the SMPS is in operation such that neither unstable closed loop operation occurs nor the performance of the controller is significantly affected. Moreover, there is a need though, to synchronize the switching frequency to an external reference signal so that, for example, a precise multi-phase operation can be achieved by connecting a plurality of SMPS in parallel or the switching frequency can be lowered to fall out of a range of frequencies that may disturb the operation of other circuitry of the SMPS.

DISCLOSURE OF THE INVENTION

The present invention relates to a power converter comprising a switched power stage configured to generate an output voltage from an input voltage and a controller configured to generate a pulse width modulated (PWM) signal to control a switching of the switched power stage in dependence of a voltage error signal. The voltage error signal is a difference between a reference voltage and the output voltage. The controller comprises a synchronizer configured to generate a first clock signal for clocking a low frequency domain of the controller. The controller further comprises a digital PWM controller clocked by the first clock signal and configured to determine an on-time information of the PWM signal and a PWM generator configured to generate the PWM signal based on the on-time information. The synchronizer is configured to synchronize a frequency of the PWM signal to a frequency imposed by the external reference signal. Such synchronization is achieved by synchronizing a frequency of the first clock signal to the frequency imposed by the external reference signal.

The synchronizer generally comprises a synchronizing loop that generates the first clock signal synchronized to the external reference signal. The controller is split into a plurality of frequency domains. Only the low frequency domain, which comprises the digital PWM controller, is clocked by the first clock signal. Thus, the operation of an output voltage regulation controlled by the digital PWM controller is decoupled from the rest of the logic of the controller, e.g. a high frequency clock domain of the controller.

The high frequency clock domain is clocked by second clock signal, wherein the frequency of the second clock signal is higher than the frequency of the first clock signal. The controller may comprise a clock generator for generating the second clock signal. Specifically, the PWM generator may be clocked by the second clock signal.

Furthermore, the power converter may comprise an analog-to-digital-converter configured to sample the external reference signal at the second clock signal. This represents an oversampled system. The use of an oversampled system as implementation of the digital PWM controller makes the performance of regulation of the output voltage completely independent from the synchronization activity thus solving the issue of unstable closed loop operation of output voltage adjustment. Parameters of the digital PWM controller for the regulation of the output voltage are not affected by the synchronization activity due to the inherent scaling operation performed on the digital PWM controller output by choice of the oversampled system architecture.

Moreover, the synchronizer may comprise a switching period time generator configured to derive a switching period time signal from the first clock signal, wherein a period of the switching period time signal corresponds to a switching period of the PWM signal and is a multiple integer of a period of the first clock signal. The PWM generator is configured to generate the PWM signal with a period that equals the period of the switching period signal. The synchronizer is configured to synchronize a frequency of the PWM signal to a frequency imposed by the external reference signal by synchronizing a frequency of the switching period time signal to the frequency imposed by the external reference signal. Thus, the digital PWM generator is not only clocked by the first clock signal that becomes synchronous to the reference signal, but also determines a switching period for the PWM signal to be generated by the PWM generator that becomes synchronous to the reference signal by operation of the synchronization loop.

A main part of the synchronization loop may be implemented by a digital phase locked loop comprising a phase-frequency detector coupled to a digital loop filter which is coupled to a digitally controlled oscillator. The phase-frequency detector is configured to compare a phase and frequency of the external reference signal and the switching period time signal to generate a phase-error signal. The loop filter is configured to filter the phase-error signal to generate a synchronization control signal. The digitally controlled oscillator is configured to generate the first clock signal based on the synchronization control signal.

One aspect of the present invention relates to the digital loop filter. Parameters of the loop filter used to synchronize the switching period time signal to the external reference signal can be programmed to tailor the speed of the synchronization activity according to requirements of the application.

As well, by programming the parameters of the digital loop filter, the system can be made insensible to abrupt variation of the frequency of the external reference signal. This improves the noise immunity of the synchronization loop as well as it allows slow adjustment of the switching frequency of the switched power stage so that the regulated output voltage is not affected by the synchronization activity.

One aspect of the present invention relates to the digitally controlled oscillator which is part of the synchronization loop. The digitally controlled oscillator may comprise a counter-based controlled oscillator to generate a division factor for a clock divider; and a clock divider configured to divide the second clock signal based on the division factor.

The synchronizer, specifically the loop filter together with the counter-based digitally controlled oscillator, is configured to adjust the division factor of the clock divider based on the synchronization control signal to match frequency and phase of the switching period time signal and the external reference signal.

The second clock signal for clocking the high frequency domain can be regarded as a system clock. Hence, no change of the system clock is required as the first clock signal for clocking the low frequency domain is derived from the system clock by means of the counter-based digitally controlled oscillator and clock divider.

Moreover, the range of frequencies where synchronization of the switching period time signal and the external reference signal is taking place can be programmed to match different applications by accordingly adjusting the range of values of the output signal of the counter-based digitally controlled oscillators accordingly. The range of frequencies where synchronization is taking place can be easily extended to cover a wide range of frequencies.

BRIEF DESCRIPTION OF THE DRAWINGS

Reference will be made to the accompanying drawings, wherein.

DETAILED DESCRIPTION OF THE INVENTION

Figure 1:
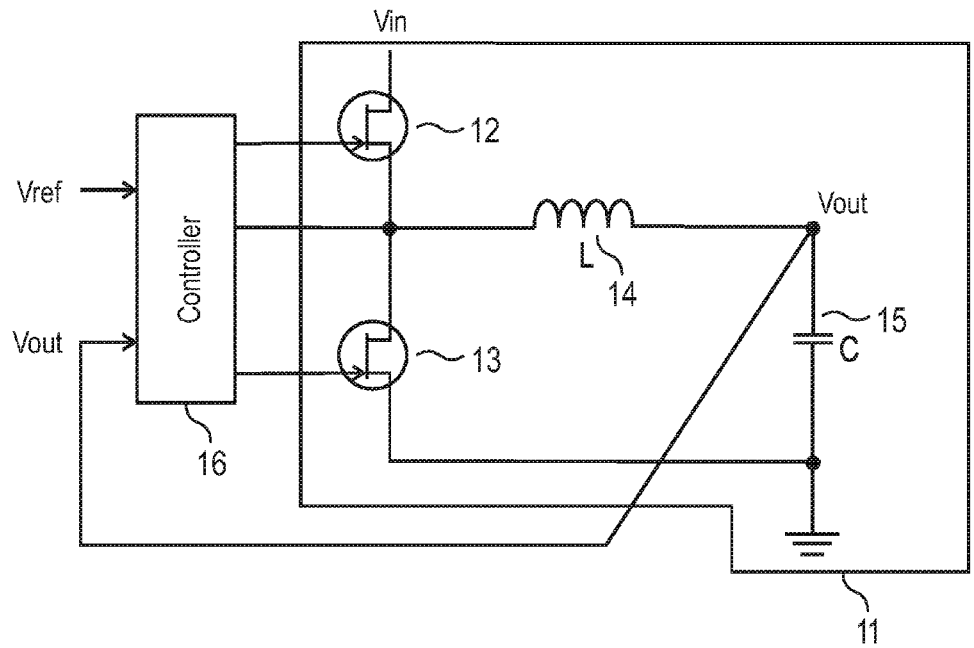
FIG. 1 shows a prior art switching buck converter.
Figure 2:
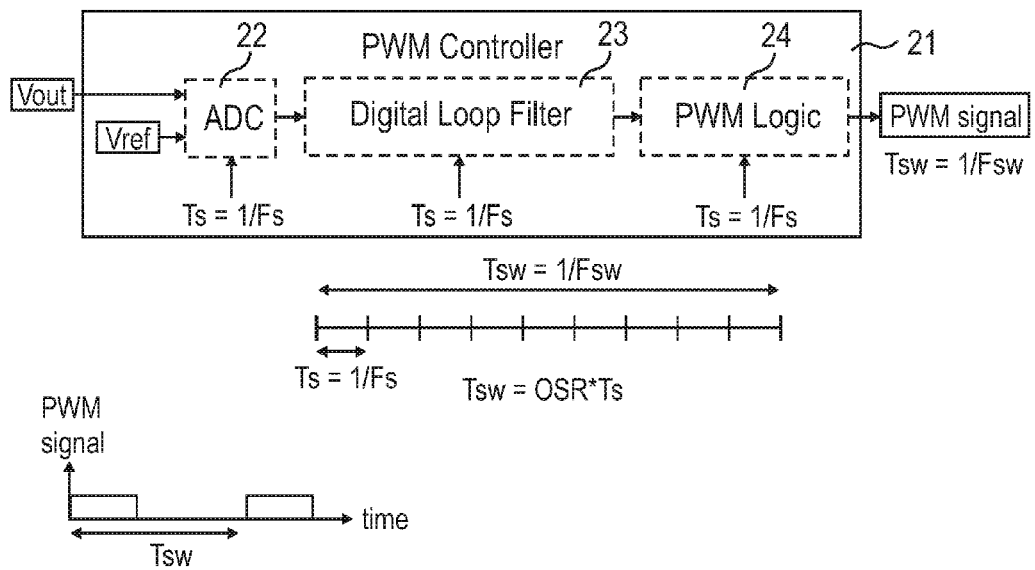
FIG. 2 shows a block diagram of a prior art PWM controller.

FIG. 2 shows an implementation of a controller generating a PWM signal for controlling the switched power stage of a SMPS. It is implemented as a digital PWM controller 21 and it regulates the output voltage by means of a digital control loop. The digital controller 21 comprises an analog to digital converter (ADC) 22, a digital loop filter 23 and PWM logic 24. The output voltage Vout is sensed by the ADC 22 and compared to a reference voltage Vref set to the desired output voltage value. The digital loop filter 23 generates an output signal containing the on-time information for the two switches and it is provided to PWM logic 24 that converts the on-time information in a pulse signal with the desired duty cycle. The duty cycle refers to a switching period Tsw related to the switching frequency of the SMPS by the relation Tsw=1/Fsw.

As shown in FIG. 2 all the logic involved in the control loop operates at a first clock frequency Fs such that the relation Tsw=OSR*Ts is always valid independently of the value of the switching frequency, wherein Ts is the sampling period of the ADC 22, Ts=1/Fs and OSR is a constant integer greater than 1. This is an oversampled architecture for the digital control loop. Variation of the switching frequency Fsw affects the sampling frequency Fs scaling the control action of the digital loop filter without affecting the regulation performance of the control loop itself.

Figure 3:
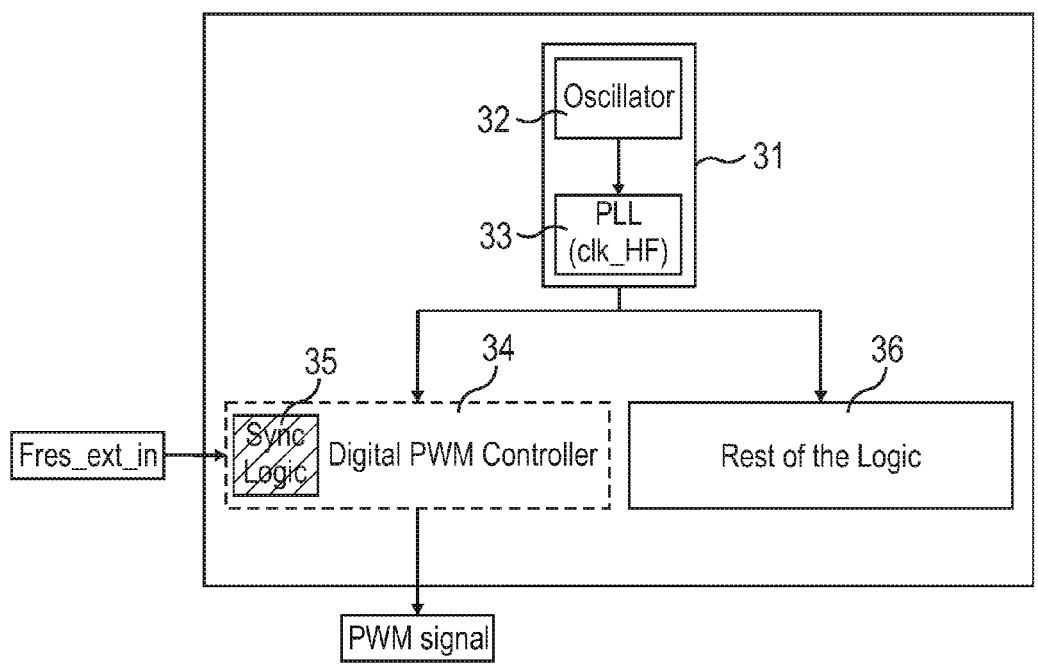
FIG. 3 shows a block diagram of a PWM controller showing a top level partitioning of the PWM controller.

According to the present invention, the operation of the output voltage regulation is decoupled from the rest of the logic as shown in FIG. 3 so that the synchronization activity of the switching frequency with respect to an external reference signal does not influence the timings of hardware not involved in the output voltage control loop itself.

An oscillator 32 together with a phase locked loop 33 forms the system clock generation unit 31 representing an absolute time reference. Solid lined blocks represent digital logic whose frequency of operation refers to the absolute time given by system clock generation unit 31 while dotted lined blocks represent digital logic operating at frequency relative to the frequency imposed by the external reference signal. Shaded blocks implement the interface between the absolute and the relative time reference, i.e. synchronization logic 35.

The absolute time reference clock signal clk_HF has the highest frequency in the system. Clock signal clk_HF is provided to both the digital PWM controller 34 and the rest of the logic 36. The digital PWM controller 34 uses the clk_HF to derive clock signals to implement the system in FIG. 2 as well as to perform synchronization to the switching frequency Fsw of the SMPS to the external reference using the architecture as shown in more detail in FIG. 4.

Figure 4:
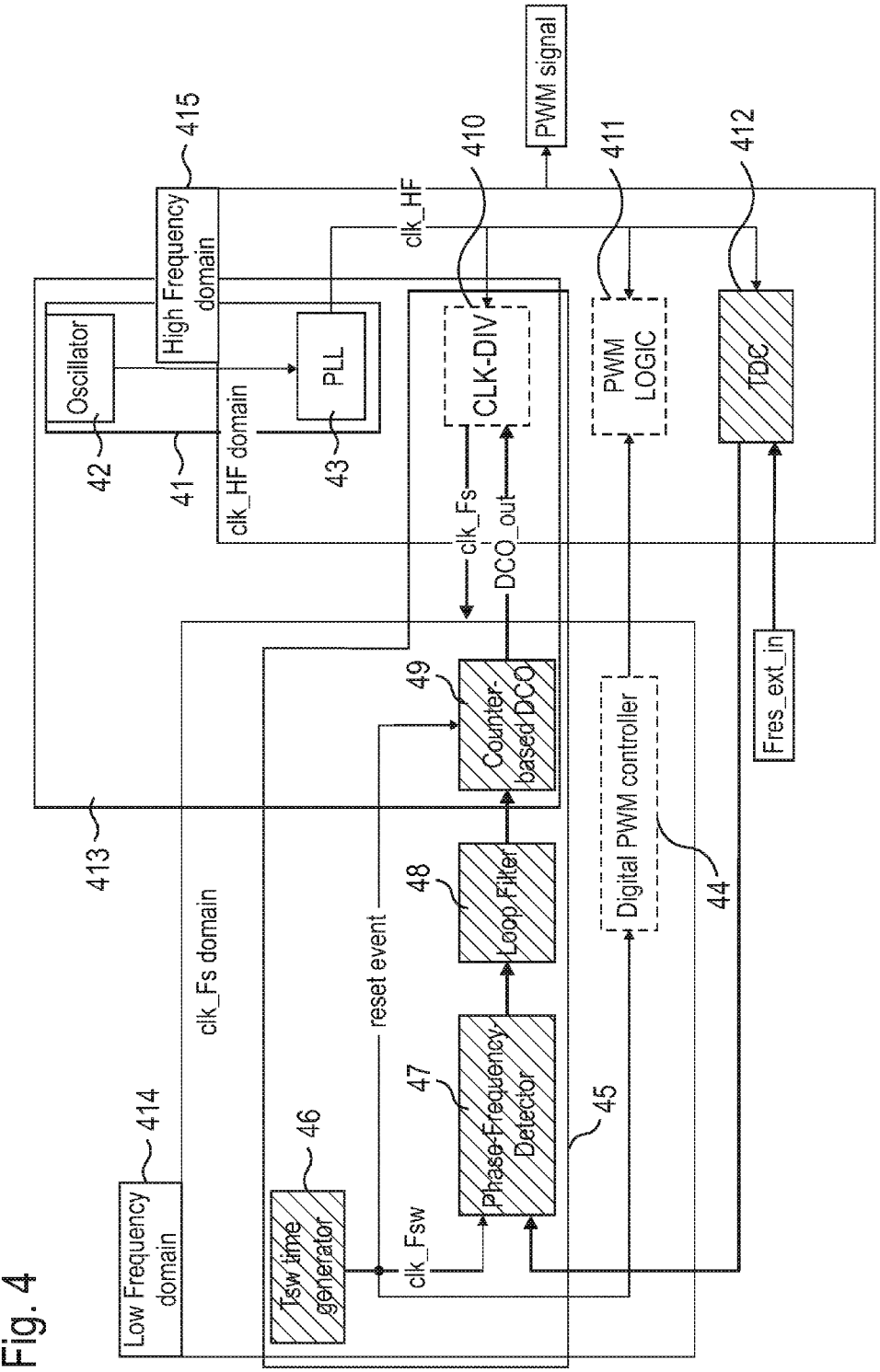
FIG. 4 shows a block diagram of the PWM controller showing the interaction between logic that performs synchronization of the switching frequency to the external reference signal and the digital PWM controller.

FIG. 4 shows a high level block diagram of the synchronization loop 45 implementing the synchronization between switching frequency Fsw of the SMPS and the external reference signal. The synchronization loop 45 comprises the switching period time signal generator 46, the phase-frequency detector 47, the digital loop filter 48, the counter-based digitally controlled oscillator (DCO) 49 and the clock divider 410. Oscillator 42 together with phase locked loop 43 forms system clock generation unit 41 generating the second clock signal clk_HF for clocking the high frequency domain 415 of the controller. The clock divider 410 divides the second clock signal clk_HF to generate the first clock signal clk_Fs for clocking the low frequency domain 414 of the controller which comprises the digital PWM controller 44.

In the proposed architecture the period of the PWM signal generated by PWM logic 411 is synchronous to the switching period time signal clk_Tsw generated in the switching period (Tsw) time generator 46. The signal clk_Tsw is generated out of the first clock signal clk_Fs to maintain the relation Tsw=OSR*Ts. The synchronization loop 45 adjusts frequency and phase of the clk_Fs by changing the division factor of the clock divider 410 operating at the second clock signal clk_HF. To synchronize the switching period time signal clk_Tsw with the external reference signal Fres_ext_in, the phase-frequency detector 47 compares clk_Tsw to Fres_ext_in and measures the phase difference. Digital loop filter 48 together with the counter-based digitally controlled oscillator 49 adjusts the division factor of the clock divider 410 to match phase and frequency of clk_Tsw with the ones of Fres_ext_in.

The range of values of the signal DCO_out generated by the counter-based DCO sets the range of frequencies for which synchronization of clk_Tsw with respect to the external reference signal is achieved. Such range of frequencies is programmable and can be asymmetric around the nominal switching frequency. Thus, the counter-based DCO 49 together with clock divider 410 and the system clock generation unit 41 forms a digitally controlled oscillator controlled by a synchronization signal generated by loop filter 48.

As shown in FIG. 4, major parts of the synchronization loop operate at frequencies Fs much lower than the system clock clk_HF thus optimizing power consumption of this block. The digital PWM controller 44 generating the on-time information for the PWM signal is also comprised in the low frequency domain. The PWM logic 411 that generates the PWM signal based on the on-time information and the synchronized switching period is comprised in the high frequency domain.

In order to perform a fine synchronization between clk_Fs and the signal Fres_ext_in the phase difference the two signals must be precisely measured. The phase frequency detector block 47 measures the phase error by measuring the time difference between the rising edge of the signal clk_Fsw and the rising edge of Fres_ext_in.

Time to Digital Converter (TDC) 412 comprised in the high frequency domain 415 samples the external reference signal Fres_ext_in at frequency clk_HF and feds it into a shift register whose length len_sr is such that clk_Ts=len_sr*clk_HF. The content of the shift register is sampled at the rising edge of clk_Fsw and the information on the phase error is extracted from the content of the shift register.

It is important to note that logic performing the time measurement operates at frequency clk_Fs which is way lower than the system clock clk_HF but performs a high resolution time measurement as if the entire logic was operating at the system clock frequency. This leads to power saving while maintaining the fine time resolution given by clk_HF.

When an external reference signal is lacking, the system is forced to operate at the nominal value Fsw_n of the switching frequency without causing a shutdown.

Due to the non-linear relationship between switching frequency Fsw and switching period Tsw (Tsw=1/Fsw) imposing a range of frequencies for the synchronization centered to the nominal value Fsw_n would lead to an asymmetric range of Tsw. However, with the present architecture the range of frequencies for whose synchronization is possible can be made symmetrical with respect to Fsw_n by programming the limits of the signal DCO_out to be asymmetric with respect to Tsw_n=1/Fsw_n. This leads to the advantage of being able to force the switching frequency to be varied only in one direction with respect to its nominal value (increase or decrease only with respect to Fsw_n) not to impact the functionality of circuitry whose may not operate properly for frequency higher or lower than the desired one.

The invention claimed is:
1. A power converter, comprising:
    a switched power stage configured to generate an output voltage from an input voltage, and
    a controller configured to generate a pulse width modulated (PWM) signal to control a switching of the switched power stage in dependence of a voltage error signal, the voltage error signal being a difference between a reference voltage and the output voltage;
    the controller comprising:
    a synchronizer configured to generate a first clock signal for clocking a low frequency domain of the controller;
    a digital PWM controller clocked by the first clock signal and configured to determine an on-time information of the PWM signal;
    a PWM generator configured to generate the PWM signal based on the on-time information; and
    wherein the synchronizer is configured to synchronize a frequency of the PWM signal to a frequency imposed by an external reference signal by synchronizing a frequency of the first clock signal to the frequency imposed by the external reference signal.

2. The power converter according to claim 1, comprising:
a system clock generation unit configured to generate a second clock signal for clocking a high frequency domain of the controller; and
wherein the PWM generator is clocked by the second clock signal and wherein a frequency of the second clock signal is higher than a frequency of the first clock signal.

3. The power converter according to claim 2, comprising:
a time-to-digital-converter configured to sample the external reference signal at the second clock signal.

4. The power converter according to claim 1,
wherein the synchronizer further comprises a switching period time generator configured to derive a switching period time signal from the first clock signal, wherein a period of the switching period time signal corresponds to a switching period of the PWM signal and is a multiple integer of a period of the first clock signal;
wherein the PWM generator is configured to generate the PWM signal with a period that equals the period of the switching period signal; and
wherein the synchronizer is configured to synchronize a frequency of the PWM signal to a frequency imposed by the external reference signal by synchronizing a frequency of the switching period time signal to the frequency imposed by the external reference signal.

5. The power converter according to claim 4, wherein the synchronizer further comprises
a phase-frequency detector configured to compare a phase and frequency of the external reference signal to the switching period time signal to generate a phase-error signal;
a digital loop filter configured to filter the phase-error signal to generate a synchronization control signal; and
a digitally controlled oscillator configured to generate the first clock signal based on the synchronization control signal.

6. The power converter according to claim 5, wherein the digitally controlled oscillator comprises a counter-based digitally controlled oscillator and a clock divider configured to divide the second clock signal; and wherein
the synchronizer is configured to adjust a division factor of the clock divider based on the synchronization control signal to match frequency and phase of the switching period time signal and the external reference signal.

7. The power converter according to claim 6, wherein the controller comprises a high frequency clock domain clocked by the second clock signal and comprising the PWM generator and the clock divider, wherein a frequency of the second clock signal is higher than a frequency of the first clock signal.

8. The power converter according to claim 5, wherein the controller comprises a low frequency clock domain clocked by the first clock signal comprises the switching period time generator, the phase frequency detector, the loop filter, the counter based digitally controlled oscillator and the digital PWM controller.

9. The power converter according to claim 5, wherein the phase-frequency detector is configured to detect the phase error by measuring the time difference between the rising edge of the switching period time signal and the external reference signal.

10. The power converter according to claim 9, wherein
the phase-frequency detector comprises a shift register whose length corresponds a ratio of the period of the first clock signal and the period of the second clock signal; wherein
the shift register is connected to the time-to-digital converter such that the sampled reference signal is fed into the shift register and wherein a content of the shift-register is sampled at the rising edge of the switching period time signal to extract information of the phase error from the content of the shift register.

11. The power converter according to claim 5, wherein the frequency of the second clock signal is a highest frequency present in the controller.

12. A control method for a power converter comprising a switched power stage configured to generate an output voltage from an input voltage according to a pulsed control signal controlling a switching of the switched power stage in dependence of a voltage error signal, the voltage error signal being a difference between a reference voltage and the output voltage, the method comprising:
generating a first clock signal for clocking a low frequency domain of the power converter;
determining an on-time information of a PWM signal using the first clock signal;
generating the PWM signal based on the on-time information;
and wherein synchronizing a frequency of the PWM signal to a frequency imposed by an external reference signal comprises synchronizing a frequency of the first clock signal to the frequency imposed by the external reference signal.

13. The control method according to claim 12, further comprising:
clocking a high frequency clock domain of the power converter by a second clock signal, wherein a frequency of the second clock signal is higher than a frequency of the first clock signal.

14. The control method according to claim 12, further comprising:
deriving a switching period time signal from the first clock signal, wherein a period of the switching period time signal corresponds to a switching period of the PWM signal and is a multiple integer of a period of the first clock signal; and wherein
synchronizing a frequency of the PWM signal to a frequency imposed by the external reference signal comprises synchronizing a frequency of the switching period time signal to the frequency imposed by the external reference signal.

15. The control method according to claim 13, wherein the frequency of the second clock signal is a highest frequency present in the controller.

* * * * *